(12) United States Patent
Noordam et al.

(10) Patent No.: US 7,682,439 B2
(45) Date of Patent: Mar. 23, 2010

(54) POLYURETHANE DISPERSANT

(75) Inventors: Arend Noordam, Oranjewoud (NL); Lothar Alexander Engelbrecht, Heerenveen (NL); Marcelles Van Der Sluis, Groningen (NL); Wendy Gezina Hof, Gronigen (NL)

(73) Assignee: Ciba Corporation Tarrytown NY (US)

( * ) Notice: Subject to any disclaimer, the term of this patent is extended or adjusted under 35 U.S.C. 154(b) by 41 days.

(21) Appl. No.: 12/223,734

(22) PCT Filed: Feb. 15, 2007

(86) PCT No.: PCT/EP2007/051459

§ 371 (c)(1), (2), (4) Date: Aug. 7, 2008

(87) PCT Pub. No.: WO2007/096290

PCT Pub. Date: Aug. 30, 2007

(65) Prior Publication Data

US 2009/0137733 A1    May 28, 2009

(30) Foreign Application Priority Data

Feb. 24, 2006  (EP)  ................. 06110410

(51) Int. Cl.
*C08G 18/67* (2006.01)

(52) U.S. Cl. ............ 106/287.3; 106/285; 106/287.25; 525/440.01; 525/440.07; 525/450; 525/454; 560/351; 560/355; 560/358

(58) Field of Classification Search ........ 106/285, 106/287.25, 287.3; 525/440.01, 440.07, 525/450, 454; 560/351, 355, 358
See application file for complete search history.

(56) References Cited

U.S. PATENT DOCUMENTS

| | | | |
|---|---|---|---|
| 5,399,294 A | 3/1995 | Quednau | 252/357 |
| 5,882,393 A | 3/1999 | Quednau et al. | 106/287.2 |
| 6,509,409 B1 | 1/2003 | Thetford | 524/589 |

*Primary Examiner*—James Seidleck
*Assistant Examiner*—Robert Jones, Jr.
(74) *Attorney, Agent, or Firm*—Joseph C. Suhadolnik

(57) ABSTRACT

The invention relates to a dispersing agent comprising: the reaction product of A one or more polyisocyanates having an average functionality of from 2.0 to 5, with B a mixture from B1 monohydroxyl compounds, and B2 monohydroxy-, monocarboxylic acid compounds to form an intermediate, followed by reacting the intermediate with C an unsaturated monohydroxy functional anchoring group.

8 Claims, No Drawings

POLYURETHANE DISPERSANT

The present invention relates to dispersing agents on the basis of a compound having nitrogen-free unsaturated anchoring groups.

Powerful mechanical forces are required for introducing solids into liquid media. This depends to a large extent on the ease with which the solid can be wetted by the surrounding medium and on the affinity to this medium. To reduce these dispersing forces, it is customary to employ dispersing agents which facilitate incorporation. These are in most cases surface-active substances, also known as tensides, which have an anion-active or cation-active and nonionic structure. These substances are added in relatively small quantities, either by direct application to the solid or by introduction into the dispersing medium. The effort required for dispersion is substantially reduced by such a tenside.

It is also known that these solids tend to reagglomerate after the dispersion process, thus vitiating the effort previously expended for dispersion and leading to serious problems. This phenomenon is explained by London/van der Waal's forces by which the solids attract each other. To overcome these forces of attraction, it is necessary to apply adsorption layers on the solids. This is achieved by using such tensides.

During and after dispersion, however, an interaction between the solid particle and the surrounding medium takes place and desorption of the tenside occurs, accompanied by its replacement by the surrounding medium, which is present at a higher concentration. This surrounding medium, however, is in most cases not capable of building up such stable adsorption layers, and the whole system breaks down. This manifests itself by a rise in viscosity in liquid systems, loss of gloss and shift in colour tone in lacquers and coatings, insufficient development of colour power in pigmented plastics, and decrease of mechanical strength in reinforced plastics.

The European patent EP0438836B1 (EFKA) relates to dispersants or salts thereof, comprising A the product of the reaction of one or more polyisocyanates having a mean functionality of from 2.0 to 5 with B a mixture of B1 monohydroxyl compounds and B2 monohydroxyl, monocarboxylic acid compounds or monoamino, monocarboxylic acid compounds, and C a compound containing at least one basic ring nitrogen and an isocyanate-reactive group, where about 30-70% of the isocyanate groups are reacted with B and about 30-70% are reacted with C.

It is an object of the present invention to provide dispersing agents which are nitrogen free, show a good dispersancy and show improved color strength.

It has now been found that superior dispersants may be obtained where an unsaturated monohydroxy functional component is attached to the polyurethane backbone.

Thus, the invention relates to a dispersing agent comprising the reaction product of A one or more polyisocyanate having an average functionality of from 2.0 to 5, with B a mixture from B1 monohydroxyl compounds, and B2 monohydroxy-, monocarboxylic acid compounds to form an intermediate, followed by reacting the intermediate with C an unsaturated monohydroxy functional anchoring group.

Component A is a polyisocyanate with the functionality of about 2 to about 5, preferably about 4. Suitable polyisocyanates are trade products like the di- and polyisocyanates available under the tradename DESMODUR from Bayer.

The mixture of a monohydroxy compound B1 and a monohydroxy-, monocarboxylic acid compound B2 is as described in the above referenced Patent EP438836B1 disclosed therein as follows:

The monohydroxyl compounds B1 used may be aliphatic, cycloaliphatic and/or araliphatic compounds. Mixtures of such compounds may also be used. Straight chained and branched aliphatic or araliphatic compounds may be used. They may be saturated or unsaturated. Saturated compounds are preferred.

The monohydroxyl compounds may also contain at least one —O— and/or COO— group, which means they are polyethers, polyesters or mixed polyether-polyesters. Examples of polyesters include those which may be obtained by the polymerization of a lactone such as propiolactone, valerolactone, caprolactone or substituted derivatives thereof, using a mono-hydroxyl starting component. The starting components used are monoalcohols, suitably with 4 to 30, preferably 4 to 14 carbon atoms, such as n-butanol but also relatively long-chained, saturated and unsaturated alcohols such as cetylalcohol, stearylalcohol, oleyl alcohol, linoloyl alcohol, oxo alcohols, cyclohexanol, phenyl ethanol, neopentyl alcohol. Alcohols of the type described above and substituted and unsubstituted alcohols may also be converted into polyoxyalkylene monoalkyl-, aryl-, aralkyl- and cycloalkyl ethers by known methods of alkoxylation with ethylene oxide and/or propylene oxide, and these monohydroxypolyethers may be used in the manner described as starting components for lactone polymerisation. Mixtures of the above-mentioned compounds may be used in all cases. These polyesters suitably have a molecular weight within the range of from about 300 to 8000, preferably 500 to 5000.

There may also be used monohydroxypolyethers obtained by the alkoxylation of alkanols, cycloalkanols and phenols. These polyethers suitably have a molecular weight within the range of from about 350 to 1500.

Preferably B1 is a caprolactone ester started with a $C_{16}$-$C_{30}$ alcohol, e.g with cetylalcohol or stearylalcohol.

The mixture of hydroxyl compounds also contains at least one monohydroxy-monocarboxylic acid compound B2

Suitable monohydroxy-monocarboxylic acid compounds may be obtained by the esterification of hydroxycarboxylic acids, by the reaction of a diol with a dicarboxylic acid or an anhydride. It is possible to start from a diol of higher molecular weight such as a poly-ethylene glycol and to react it with a single dicarboxylic acid or a dicarboxylic anhydride. It is also possible to react a dicarboxylic acid of high molecular weight with a diol of low molecular weight. Finally, it is also possible to react almost stoichiometric quantities of diol of low molecular weight and dicarboxylic acid of low molecular weight with each other under such conditions as to form as much monohydroxy-monocarboxylic acid as possible and anyhow no or substantially no dihydroxyl compound.

The dicarboxylic acids and anhydrides are readily available from commercial sources and methods for their preparation are well known. Examples are succinic, glutaric, adipic, sebacic, fumaric, maleic, itaconic, 1,4- cyclohexanedicarboxylic, phthalic, terephthalic, isophthalic, naphthalene dicarboxylic acid and the like. A preferred example is maleic acid.

Diols are e.g. glycols including ethylene glycol and propylene glycol and mixtures thereof or other glycols like 1,3-propanediol, 1,3-butanediol, 1,4-butanediol, neopentyl glycol, 1,5-pentanediol, 1,6-hexanediol, 1,8-octanedol and the like.

Preferably B2 is the reaction product of a dicarboxylic acid with a diol of higher molecular weight such as polyethylene glycol.

The ratio of the quantities of hydroxyl groups contained in, on the one hand, the monohydroxyl compound and, on the other hand, the monohydroxy-monocarboxylic acid compound may vary within relatively broad limits, depending on their use. Preferably, the monohydroxy-monocarboxylic acid compound is present in a deficiency with respect to the monohydroxyl compound. The ratio of the number of hydroxyl groups originating from both types of compounds varies from 1:1 to 10:1. Preferably, this ratio ranges from 2:1 to 5:1.

The Main Aspect of the Invention is the Unsaturated Anchoring Group C.

Suitable are unsaturated aliphatic or cycloaliphatic alcohols or alcohols having an aromatic substituent or ethoxylated unsaturated alcohols.

Unsaturated aliphatic alcohols are e.g. allyl alcohol, butenol, hexenol and 2-hydroxyethyl acrylate and the like or alcohols having an acetylenic compound such as propargyl alcohol, butynenols and the like.

The anchoring group C is nitrogen free. The anchoring character is based on the double bond.

Unsaturated cycloaliphatic alcohols are cyclohexeneols or cyclooctenols and the like.

Alcohols having an aromatic substituent are e.g. 2-thiophene methanol or furfuryl alcohol and the like.

An example for an ethoxylated alcohol is a propargyl alcohol alkoxylate commercially available under the tradename Korantin PM.

Preferably compound C is propargyl alcohol.

The reaction of isocyanate groups takes place by applying known methods. In general, it is preferred to carry out the reaction in such a manner that in a first stage the polyisocyanate is reacted with a mixture of a monohydroxyl compound and a monohydroxy-monocarboxylic compound. This reaction generally occurs in a suitable solvent (e.g. hydrocarbons such as xylenes, toluenes, ethers such as dioxane, esters such as butyl acetate, methoxypropyl-acetate, and dimethylformamide), optionally in the presence of a catalyst such as dibutyltin dilaurate, iron acetyl acetonate or triethylenediamine. It is also possible to first react the polyisocyanate with the monohydroxyl compound and to further react the resulting reaction product with the carboxylic acid compound.

After this reaction, in which in general about 40-80% of the isocyanate groups will be reacted, the reaction is carried out with the unsaturated monohydroxy functional compound C. This will lead to a reaction of about 20-60% of the isocyanate groups. Isocyanate groups that may not have reacted are finally deactivated by the reaction with a lower alcohol or a comparable compound. Particularly butanol is suitably used.

Thus, the invention further relates to a process for the manufacture of dispersants including the reaction of A one or more polyisocyanates having an average functionality of from 2.0 to 5, with B a mixture from B1 monohydroxyl compounds, and B2 monohydroxy-, monocarboxylic acid compounds to form an intermediate, followed by reacting the intermediate with C an unsaturated monohydroxy functional anchoring group, in which 40-80% of the isocyanate groups of the polyisocyanate A are reacted with B1 and B2 and 20-60% of the isocyanate groups are reacted with C.

The invention further relates to the use of dispersants to disperse solid compounds, preferably pigments.

EXAMPLES

The invention will now be illustrated by some examples.

Example 1

General Synthesis Procedure Addition of B1 Followed by B2

In a 250 ml three neck flask, equipped with thermometer, cooler and stirrer, 25 parts of n-butyl acetate, 20 parts of methoxypropyl acetate and 24 parts of toluene diisocyanate pentamer (about 50% in BuOAc) are heated under nitrogen to 75° C. 15 parts of a caprolactone ester started with a monohydroxy compound, are added. The mixture is stirred at 75° C. for 2 hours. 4 parts of a hydroxycarboxylic acid and 2 parts of polyethylene glycol 1000 are added and reacted at 75° C. for 2 hours. Next a unsaturated monohydroxy functional component C [amount and type see table 1] is added and stirred at 75° C. for 1 hour. In the last step the excess of free NCO-groups is captured with 3 parts of sec-butanol and the solid content is corrected with BuOAc to 40%.

Example 1A

General Synthesis Procedure, Addition of B1 and B2 Simultaneously

In a 250 ml three neck flask, equipped with thermometer, cooler and stirrer, 25 parts of n-butyl acetate, 20 parts of methoxypropyl acetate and 24 parts of toluene diisocyanate pentamer (about 50% in BuOAc) are heated under nitrogen to 75° C. 15 parts of a caprolactone ester started with a monohydroxy compound B1, 4 parts of a hydroxycarboxylic acid B2 and 2 parts of polyethylene glycol 1000 are added simultaneously and reacted at 75° C. for 3 hours. Next a monohydroxy functional component [amount and type see table 1] is added and stirred at 75° C. for 1 hour. In the last step the excess of free NCO-groups is captured with 3 parts of sec-butanol and the solid content is corrected with BuOAc to 40%.

TABLE 1

| | Anchoring group C | |
|---|---|---|
| EXAMPLE | HYDROXY COMPONENT | AMOUNT |
| 1 | Propargyl alcohol | 7 parts |
| 3 | KORANTIN PM | 20 parts |
| 4 | Furfuryl alcohol | 15 parts |

Example 2

Application Example

TABLE 2

Composition of pigment concentrates

|  | 1 | 2 | 3 | 4 | 5 | 6 | 7 | 8 |
|---|---|---|---|---|---|---|---|---|
| Laropal A-81 60% | 12.0 | 12.0 | 14.0 | 14.0 | 13.2 | 13.2 | 14.0 | 14.0 |
| EFKA-4047 | 2.4 | — | 5.2 | — | 3.2 | — | 3.4 | — |
| Example 1 | — | 2.4 | — | 5.2 | — | 3.2 | — | 3.4 |
| EFKA-6745 | — | — | 0.4 | 0.4 | — | — | — | — |
| Ircogel 905 | 0.6 | 0.6 | — | — | 0.6 | 0.6 | — | — |
| Solvesso 100 | 3.0 | 3.0 | 5.2 | 5.2 | 2.6 | 2.6 | 9.3 | 9.3 |
| MPA | 3.0 | 3.0 | 5.2 | 5.2 | 2.6 | 2.6 | 9.3 | 9.3 |
| Heliogen blue L 6975 F | — | — | 10.0 | 10.0 | — | — | — | — |
| Carbon Black FW 200 | — | — | — | — | — | — | 4.0 | 4.0 |
| Total | 60.0 | 60.0 | 40.0 | 40.0 | 60.0 | 60.0 | 40.0 | 40.0 |

EFKA 4047 is a commercially available polyurethane dispersant.
EFKA 6745 is a commercially available dispersant additive for phthalocyanine pigments.
Laropal ® A 81 is condensation product of urea and aliphatic aldehydes, available from BASF.

Ircogel 905 (Lubrizol) is a thixotropic agent.

The products were tested for carbon black dispersancy and Heliogen blue dispersancy using the Haake rheology test. Viscosities were measured on Rheometer Haake RS 600 In particular, the viscosity expressed in Pa·s, of the dispersion is measured at different shear gradients (expressed in 1/s). The results of these measurements appear in Tables 3 and 4.

TABLE 3

Viscosities of Heliogen blue L 6975 F pigment concentrates

| Viscosity Pa · s EFKA 4047 | Viscosity Pa · s Example 1 | Sheer gradient 1/s |
|---|---|---|
| 350 | 200 | 0.1 |
| 50 | 300 | 1.0 |
| 5 | 5 | 10.0 |
| 0.5 | 0.5 | 100 |
| 0.05 | 0.05 | 1000 |

TABLE 4

Viscosities of Carbon Black FW 200 pigment concentrates

| Viscosity Pa · s EFKA 4047 | Viscosity Pa · s Example 1 | Sheer gradient 1/s |
|---|---|---|
| 350 | 250 | 0.1 |
| 40 | 30 | 1.0 |
| 3 | 3 | 10.0 |
| 0.3 | 0.3 | 100 |
| 0.07 | 0.07 | 1000 |

Tab. 3 and 4 show that the dispersancy is good and comparable to the commercially available dispersant EFKA 4047 (polyurethane dispersant)

TABLE 5

2 Pack PU coatings with various pigments concentrates

| | Used pigment concentrate (see Table 2) | 9 | 10 | 11 | 12 |
|---|---|---|---|---|---|
| 2-pack PU (A) | | 7.0 | 7.0 | 7.0 | 7.0 |
| Heliogen blue L 6975 F | 3 (EFKA 4047) | 0.5 | — | — | — |
| Heliogen blue L 6975 F | 4 (Example 1) | — | 0.5 | — | — |
| Carbon Black FW 200 | 7 (EFKA 4047) | — | — | 0.5 | — |
| Carbon Black FW 200 | 8 (Example 1) | — | — | — | 0.5 |
| 2-pack PU (B) | | 2.5 | 2.5 | 2.5 | 2.5 |
| Total | | 10.0 | 10.0 | 10.0 | 10.0 |

Incorporation: low shear (hand mixing)
Draw down: 75 μm
Polyester film

TABLE 6

2-pack PU coatings application results in terms of gloss, seeding, transparency, rub-out, homogeneity and colour

| Coating formulation (see Tab. 5) | s | T | r | h | c | Gloss 20° | Gloss 60° |
|---|---|---|---|---|---|---|---|
| 9 (comparative) | 2 | 1 | — | — | R | 101 | 102 |
| 10 (inventive, Ex. 1) | 1 | 1 | — | — | 3 | 100 | 101 |
| 11 (comparative) | 8 | 1 | — | — | R | 84 | 91 |
| 12 (inventive, Ex. 1) | 3 | 3 | — | — | 1 | 90 | 94 |

Gloss measured with sheen triglossmaster
Explanation results:
s = seeding
T = transparency
r = rub-out
c = color
h = homogeneity
Seeding:
1 = no seeding
8 = lot of seeding
Transparency:
1 = Transparent
8 = Not transparent
Rub-out:
1 = no floating
8 = lot of floating TABLE 6-continued 2-pack PU coatings application results in terms of gloss, seeding, transparency, rub-out, homogeneity and colour

| Coating formulation (see Tab. 5) | S | T | r | h | c | Gloss 20° | Gloss 60° |
|---|---|---|---|---|---|---|---|

Homogeneity:
1 = homogeneous
8 = not homogeneous
Color:
R = reference
1 = color strength better than reference
4 = color strength same as reference
8 = color strength worse than reference.

The above Table shows an improved color strength for the dispersant having a propargyl anchoring group.

The invention claimed is:

1. Dispersing agent comprising the reaction product of
   A one or more polyisocyanates having an average functionality of from 2.0 to 5, with
   B an intermediate formed from a mixture of B1 monohydroxyl compounds, and B2 monohydroxy-monocarboxylic acid compounds, followed by reacting the intermediate with
   C an unsaturated monohydroxy functional anchoring group which anchoring group is nitrogen free.

2. Dispersing agent according to claim 1, wherein 40-80% of the isocyanate groups of the polyisocyanate A are reacted with B1 and B2 and 20-60% of the isocyanate groups are reacted with C.

3. Dispersing agent according to claim 1, wherein
   B1 is a polyester compound formed from caprolactone in a reaction started with a $C_{16}$-$C_{30}$ alcohol,
   B2 is the reaction product of dicarboxylic acid with a diol,
   C is an unsaturated aliphatic or cycloaliphatic alcohol or an alcohols having an aromatic substituent or an ethoxylated unsaturated alcohol.

4. Dispersing agent according to claim 3, wherein B2 is the reaction product of a dicarboxylic acid with polyethylene glycol and C is propargylalcohol.

5. A process for the manufacture of dispersants according to claim 1 comprising the reaction of
   A one or more polyisocyanates having an average functionality of from 2.0 to 5, with
   B an intermediate formed from a mixture of B1 monohydroxyl compounds, and B2 monohydroxy-monocarboxylic acid compounds, followed by reacting the intermediate with
   C an unsaturated monohydroxy functional anchoring group which anchoring group is nitrogen free in which 40-80% of the isocyanate groups of the polyisocyanate A are reacted with B1 and B2 and 20-60% of the isocyanate groups are reacted with C.

6. A process for the manufacture of dispersants according to claim 5, wherein
   B1 is a polyester compound formed from caprolactone in a reaction started with a $C_{16}$-$C_{30}$ alcohol,
   B2 is the reaction product of dicarboxylic acid with a diol, and
   C is an unsaturated aliphatic or cycloaliphatic alcohol or an alcohols having an aromatic substituent or an ethoxylated unsaturated alcohol.

7. A process for the manufacture of dispersants according to claim 6, wherein B2 is the reaction product of a dicarboxylic acid with polyethylene glycol and C is propargylalcohol.

8. A pigment dispersion comprising a pigments and a dispersant according to claim 1.

* * * * *